Figure 1:
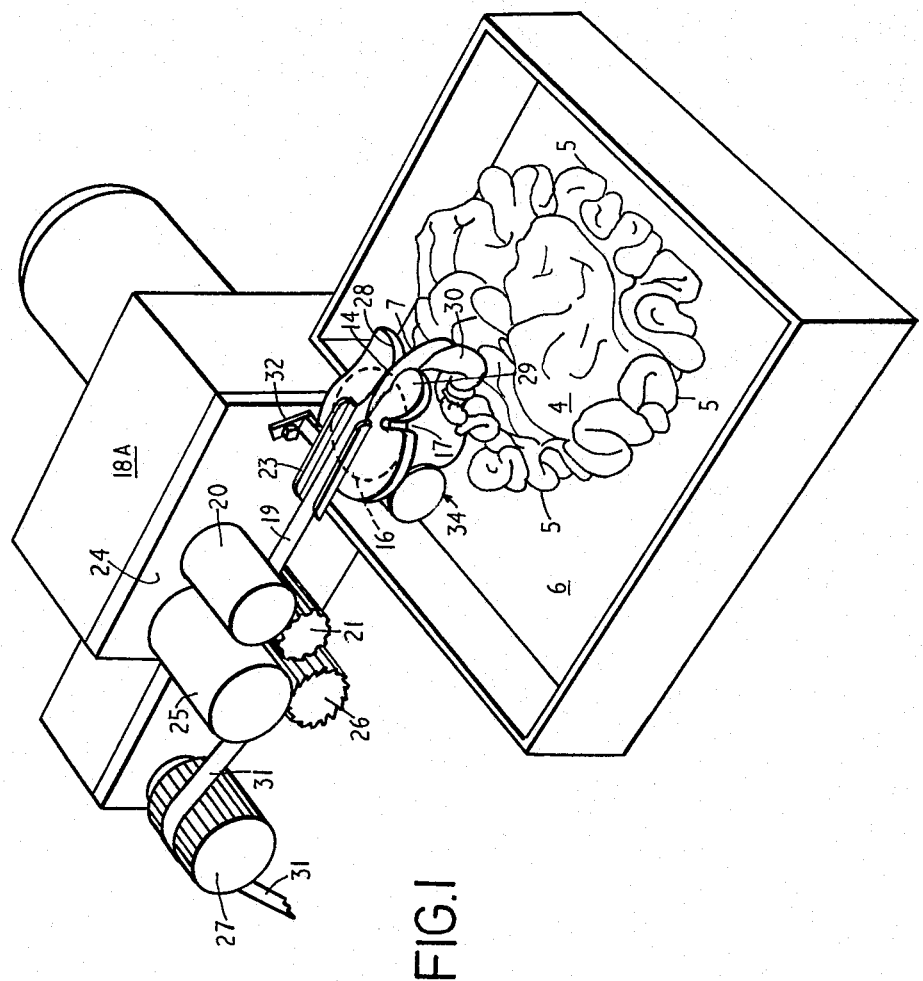

United States Patent [19]

Evers et al.

[11] 3,918,124

[45] Nov. 11, 1975

[54] SEPARATION AND ISOLATION OF A PORTION OF ANIMAL INTESTINE

[75] Inventors: Roy J. Evers, Cronulla; Darcy Glen Perrett, Peakhurst, both of Australia

[73] Assignee: Davis & Geck Australia Pty. Limited, Hurstville, Australia

[22] Filed: July 30, 1973

[21] Appl. No.: 383,846

[30] Foreign Application Priority Data
July 31, 1972 Australia.............................. 9905/72

[52] U.S. Cl. .................................................. 17/43
[51] Int. Cl.² ........................................ A22C 17/16
[58] Field of Search .............. 17/1 R, 43, 49, 50, 52

[56] References Cited
UNITED STATES PATENTS

| | | | |
|---|---|---|---|
| 1,723,714 | 8/1929 | Stohrer | 17/43 |
| 2,595,638 | 5/1952 | Castelow | 17/43 |
| 2,720,678 | 10/1955 | Valentine | 17/43 |
| 3,037,238 | 6/1962 | Castelow | 17/43 |

FOREIGN PATENTS OR APPLICATIONS

| | | | |
|---|---|---|---|
| 244,635 | 4/1963 | Australia | 17/43 |
| 214,362 | 4/1958 | Australia | 17/43 |

Primary Examiner—Richard C. Pinkham
Assistant Examiner—Marvin Siskind
Attorney, Agent, or Firm—Ladas, Parry, Von Gehr, Goldsmith & Deschamps

[57] ABSTRACT

Apparatus for isolating and running off a gold beater strand of the serosa membrane portion of the small intestine of a animal, for example a steer. The apparatus comprises an orientation horn made up of three rods which form a common joint adjacent the leading end of the horn, which leading end is curved and rounded in order that a portion of small intestine tube which has initially been manually severed from the stomach of a beast may be fed on to the leading end of the horn and initially manually fed along the horn. A rotary blade is provided in the region between the three rods. One of the rods is affixed to the apparatus above the rotary blade and the other two rods are affixed to the apparatus below the rotary blade. The rotary blade severs the small intestine tube as it is fed along the horn and the upper portion of the tube containing the gold beater strand is fed over the upper rod whereas the remainder of the small intestine tube, the mesentery web and the stomach portion fall away below the lower two rods.

12 Claims, 3 Drawing Figures

SEPARATION AND ISOLATION OF A PORTION OF ANIMAL INTESTINE

This invention relates to apparatus for isolating and running off a gold beater strand of the serosa membrane portion of the small intestine of an animal, for example a steer. The gold beater strand, which is the most valuable part of the serosa membrane, is substantially located in that annular part of the small intestine tube remote from the fatty tissue between the tube and the outer wall of the stomach of the animal concerned.

The present method of isolating and slitting the gold beater strand of a serosa membrane of an intestine tube is described in our Australian Patent of Addition No. 418,041. This process involves the manual feeding of an intestine tube, which has previously been separated from a stomach or crown, over a guide or horn and thereafter slitting the tube.

The present method of separation of an intestine tube from the stomach or crown is performed either manually, by a skilled operator or by use of the apparatus described in our co-pending Australian Patent Application No. PA 9904.

The present invention provides an apparatus which will combine the previous operations of separation of the small intestine tube from the stomach and isolation of the gold beater strand of the serosa membrane from the remains of the small intestine into one operation and will subsequently provide a more economic and accurate means of producing a valuable gold beater strand of a serosa membrane.

For ease of description, the apparatus of this invention will be described with respect to its orientation for normal use. However, it will be appreciated that the apparatus may be manufactured, sold, transported and otherwise dealt with in orientations other than those specified.

This invention consists in apparatus for isolating a part of the tubular small intestine of a beast, said apparatus comprising orientation means having a leading end adapted to receive therearound a piece of small intestine tube and cutting means disposed at or adjacent the following end of said orientation means and adapted to sever the small intestine tube longitudinally as the tube is fed along the orientation means.

One embodiment of this invention provides apparatus for isolating a part of the tubular small intestine of a beast, said apparatus comprising an orientation horn composed of two or more rods, which rods form a common joint adajcent the leading end of said horn, said leading end being curved and adapted to receive therearound an initial piece of small intestine tube which has been manually separated from the stomach, one or more of said rods being affixed to the apparatus above and one or more of said rods being affixed to the apparatus below a substantially horizontal rotary blade, which blade is so positioned in relation to said horn that it severs the intestine tube in a substantially diagonal direction as said intestine tube is pulled over said horn whereby the severed upper portion of said tube incorporating the gold beater strand of the serosa membrane is delivered over and apart from said blade and the remainder of the intestine tube together with the mesentery web, the fatty tissue located between the intestine tube and the stomach, and the stomach falls away below the blade.

It is preferred that the rotary blade be provided with a housing and that a slot be provided in the blade housing adjacent the horn so that severing of the intestine tube is effected by the blade as it rotates through the slot in the housing.

It is further preferred that a second slot be provided in the housing spaced from the first slot. This second slot may be used for introducing the stomach with the small intestine tube attached thereto for an initial severing of the intestine tube, the initially severed leading end of the intestine tube being fed onto a curved leading end of the horn.

Figure 2:
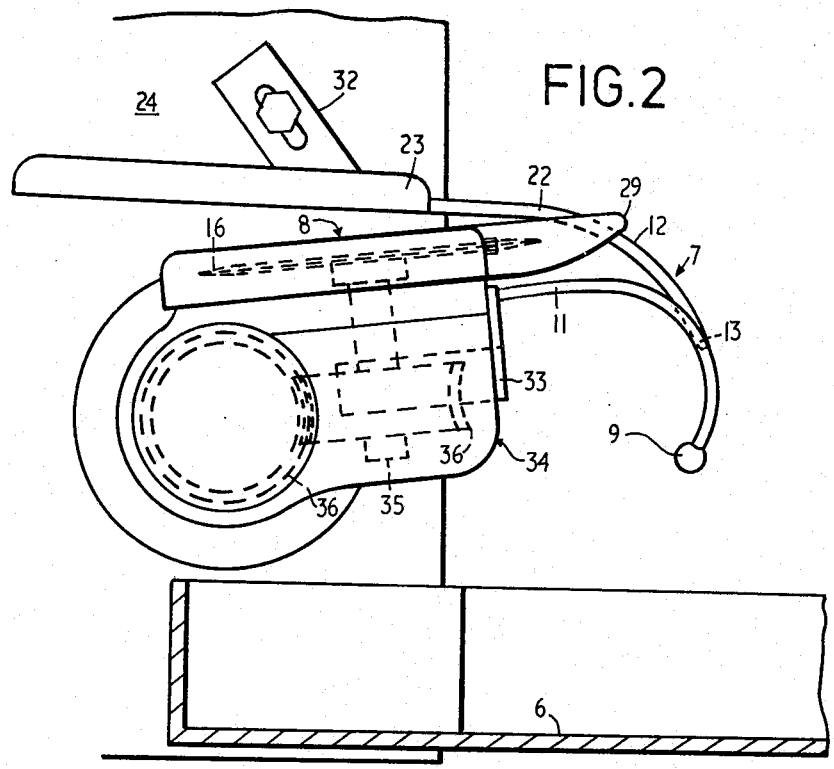
Figure 3:
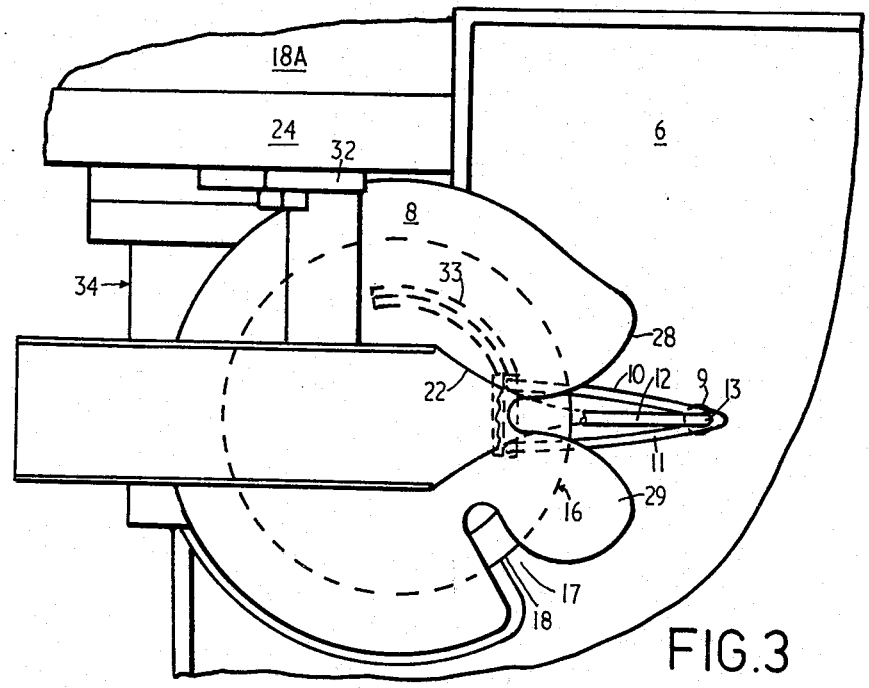

By way of example only, one embodiment of apparatus according to this invention will be described with reference to the accompanying drawings wherein:

FIG. 1 is a perspective view of the apparatus showing a small intestine being passed through the cutting device and beater rollers (to be described), FIG. 2 is a fragmentary side elevation, to an enlarged scale, of the cutting device and orientation horn, and, FIG. 3 is a plan view of that part of the apparatus shown in FIG. 2.

The invention will now be described in greater detail with reference to a particular embodiment.

The crown or stomach 4 comprising the small intestine tube 5 is located on a tray 6 in proximity to the orientation horn 7. The orientation horn 7 is adapted for mounting on the rotary blade housing 8 in such a manner that its leading end 9 is directed away from the housing 8 and the shape of the hook-shaped horn 7 is defined by three rods 10, 11 and 12 which diverge from a common joint 13 near the leading end 9 and terminate at three separate points on the apparatus, one of said points being above the blade 16, the other two being below the blade 16, slot 14 in blade housing 8 being located adjacent joint 13 of rods 10, 11 and 12.

The abovementioned one slot 14 in the housing has the effect of exposing the edge 15 of the rotary blade 16 a sufficient amount such that the length of the blade 16 exposed is approximately equal to the outer diameter of an intestine tube 5.

A second slot 17 of similar dimension to the abovementioned slot is provided a short circumferential distance along housing 8 therefrom and away from the main gear train enclosed in a case 18A. The second slot 17 similarly exposes a short portion 18 of the rotary blade 16 for the purpose of severing an initial length of the intestine tube 5 from the stomach or crown 4 so that that initial length is sufficient to be fed over the orientation horn 7, over the rotary blade portion 15 exposed in the firstmentioned slot 14, such that the gold beater strand 19 of the serosa membrane is isolated due to the intestine 5 passing in a radial direction over the blade 16 and between the rollers 20 and 21, so avoiding the necessity for lifting and controlling the stomach or crown 4 at the start of the operation.

Mounted above the top surface of the rotary blade housing 8 between the orientation horn 7 and a set of first rollers 20 and 21 are an orientation node 22 and guide channel 23 for supporting and directing the severed part 19 of the intestine tube incorporating the gold beater strand of the serosa membrane from its point of isolation at the rotary blade edge 15 to its passage between the set of first rollers 20 and 21.

The first rollers 20 and 21 are mounted on horizontal shafts (not shown) extending from the face plate 24 of the main casing 18A adjacent the guide channel 23, and are vertically opposed. The upper roller 20 is a control pressure roller and is free to rotate on its shaft, and may have a toothed rubber surface. The lower roller 21 is a control pulling roller and is driven through the gear train. The surface of the lower roller 20 has preferably a toothed profile and is of resilient material such as rubber. The faces of the two abovementioned rollers are in pressure contact.

A set of further rollers 25 and 26 is mounted on the face plate 24 adjacent the set of first rollers. The two further rollers 25 and 26 are mounted on horizontal shafts (not shown). The upper further roller 25 is a table pressure roller, is free to rotate on its supporting shaft and preferably has a smooth resilient surface such as rubber. The lower further roller 26 is a beater roller, is driven through the gear train and has a toothed profile of resilient material such as rubber. The surfaces of the two further rollers 25 and 26 are in pressure contact.

Spaced from the lower further roller 26 and also mounted on a shaft extending through the face plate is a pickup roller 27 having a toothed surface profile preferably of resilient material such as rubber.

In operation, and as previously stated, a small leading portion of the intestine tube 5 is initially separated from the crown or stomach 4 by feeding the tube 5 into the second slot 17 to engage the rotating rotary blade 16 and so sever the mesentery web and fatty tissue which attaches the initial part of the intestine tube to the stomach or crown 4. After severing approximately 6 inches to 8 inches of intestine tube 5 from the stomach or crown 4, that portion of the tube is then manually fed over the orientation horn 7, into the first slot 14 in the rotary blade housing 8, into contact with the exposed edge 15 of the rotating rotary blade 16 in a radial direction, the remaining part (comprising the gold beater strand of the serosa membrane) 19 of which passes over the two guide blocks 28 and 29 and between the set of first rollers 20 and 21.

Because the set of first rollers 20 and 21 rotate in opposite directions and are in pressure contact, the serosa membrane 19 upon contacting the two rollers 20 and 21 is automatically drawn between them. At this point the operation becomes automatic.

The orientation horn 7 is aligned in relation to the rotary blade 16 in the first slot 14 in such a way that as the intestine tube 5 passes into contact with the rotating rotary blade 16, with the stomach or crown 4 hanging downwardly, the intenstine tube 5 is cut by the blade 16 in a plane substantially coincident with the horizontal diameter of the intestine tube 5. At this point the lower part 30 of the intestine tube 5 which is integrally attached to the crown or stomach 4, falls away into the tray 6 with that part of the crown or stomach 4 in proximity thereto. The upper part of the intestine tube 19, incorporating the gold beater strand of the serosa membrane, isolated from the remaining stomach 4 and lower intestine tube 30, continues on, as previously stated, over the first and second guide blocks 28 and 29 and into engagement with the set of first rollers 20 and 21. It may be necessary to effect initial engagement of the leading end of tube 19 with rollers 20 and 21 manually.

The set of first rollers 20 and 21 operate to continually pull the intestine tube 5 over the orientation horn 7 and rotating rotary blade 16 until the entire length of the upper portion 19 of the intestine tube 5 has been isolated.

After passing between the set of first rollers 20 and 21 the portion of intestine tube 19 is fed automatically between the set of further rollers 25 and 26 and the lower further roller or beater roller 26, which rotates in the same direction as, and at approximately twice the speed of, the control pulling roller 25, wipes across the lower surface of the portion of intestine tube 19 so removing the inner lining of the portion 19 and leaving an outer layer or gold beater strand 31, which strand 31 is the finished product produced by the apparatus of this invention.

Finally the gold beater strand 31 passes over the pick-off roller 27 and into a container (not shown). The pick-off roller 27 rotates in the same direction and at the same speed as the control pulling roller 25.

In one particular form of the invention the pick-off roller 27 and control pulling roller 25 rotate at 250 RPM and the beater roller 26 rotates at 600 RPM.

The central rod 12 of the horn 7 together with the node 22 and channel 23 are adjustably mounted on the face plate 24 of the case 18 by means of a bracket 32. The remaining two rods 10 and 11 of the horn 7 are mounted on a bracket 33 which is secured to the body of a gearbox 34 which is mounted on the case face plate 24. The blade 16 is mounted on a vertical shaft 35 within the gearbox 34 and said shaft is driven through spiral gears 36 from the main drive within the case 18. The blade housing 8 is secured to the top of the gearbox 34.

In an alternate form of the invention the orientation horn is provided with a detachable spring wire passing from the leading end to the rotary disc housing. The spring wire is bent in substantially the same shape as the profile of the orientation horn and has the effect of increasing the cross sectional size of the orientation horn to accommodate larger intestines which may be encountered.

The apparatus of the present invention may also be provided with a hook means for supporting the crown or stomach at the initial stages of the operation in order to take some load off the orientation horn.

A slitting wheel may also be provided between the orientation horn and the set of first rollers for slitting the serosa membrane into a plurality of strips prior to the subsequent previously described operations. The finished product would be, in this case, a plurality of narrower gold beater strands.

In a further alternate form of the invention, means are provided for spraying fluid such as water in the vicinity of the lower further roller in order to prevent the severed gold beater strand from winding around this lower further roller should this strand become detached from the pick-off roller.

What we claim is:

1. Apparatus for isolating a part of the tubular small intestine of a beast, said apparatus comprising an orientation horn having a leading end and a following end and being composed of at least two rods, which rods form a common joint adjacent the leading end of said horn, said leading end being curved and adapted to receive therearound an initial piece of small intestine tube which has been manually separated from the stomach; a substantially horizontal rotary blade disposed adjacent said following end of said orientation horn; at least one of said rods being affixed to the apparatus above and at least one of said rods being affixed to the apparatus below said substantially horizontal rotary blade, which blade is so positioned in relation to said horn that it severs the intestine tube in a substantially diagonal direction as said intestine tube is pulled over said horn whereby the severed upper portion of said tube incorporating the gold beater strand of the serosa membrane is delivered over and apart from said blade and the remainder of the intestine tube together with the mesentery web, the fatty tissue located between the intestine tube and the stomach, and the stomach falls away below the blade; and a first set of upper and lower rollers in pressure contact with each other, at least one of said rollers having a toothed resilient surface, said rollers being spaced from said horizontal blade and located in a position so that said severed upper portion of the intestine tube may be fed through said rollers whereby the remaining stomach and intestine may be pulled by the action of said rollers into contact with said horizontal blade.

2. Apparatus as defined in claim 1 having one of said rods affixed to the apparatus above and two rods affixed to the apparatus below said blade, those parts of the rods affixed to the apparatus below the blade adjacent their points of fixation to the apparatus lying in a substantially horizontal plane.

3. Apparatus as defined in claim 1 wherein said rotary blade is provided with a housing, said housing having a first circumferential slot in the vicinity of the said rods so that severing of the small intestine tube is effected by the rotary blade rotating in the region of said slot.

4. Apparatus as defined in claim 3 wherein said housing is provided with a further circumferential slot spaced from said first slot and positioned so that an initial severing of a piece of small intestine tube from said stomach may be effected by advancing the intestine tube attached to the stomach to the blade rotating in the region of said further slot.

5. Apparatus as defined in claim 3 and further including a guide channel provided in the region substantially above the blade housing, along which guide channel the severed portion of intestine tube may travel away from said first slot in said housing.

6. Apparatus as defined in claim 5 wherein said first set of upper and lower rollers is provided above and spaced from the blade housing.

7. Apparatus as defined in claim 3 wherein said first set of upper and lower rollers is disposed above and spaced from said housing.

8. Apparatus as defined in claim 7 wherein the lower roller of said first set of rollers is motor driven.

9. Apparatus as defined in claim 8 wherein a second set of upper and lower rollers is provided adjacent said first set of upper and lower rollers so that severed intestine tube may be fed through said second set of rollers after said first set of rollers, at least one of said pair of second rollers having a surface of resilient toothed material, said second upper and lower rollers being in pressure contact one with the other, the lower of said second pair of rollers having a diameter approximately equal to that of the lower first roller and being motor driven to rotate at a speed greater than the speed of rotation of said first pair of rollers.

10. Apparatus as defined in claim 8, wherein a further single roller is provided adjacent the end of the apparatus remote from said orientation horn over which the processed severed small intestine tube may be passed for collection.

11. Apparatus as defined in claim 1 and including a detachable spring wire in the orientation horn adjacent the hooked end thereof.

12. Apparatus as defined in claim 1 further including a slitting wheel adapted to slit the severed portion of intestine tube.

* * * * *